Nov. 18, 1924.
H. O. RUGH
1,516,061
WIRELESS RECEIVING SYSTEM
Filed Nov. 16, 1922
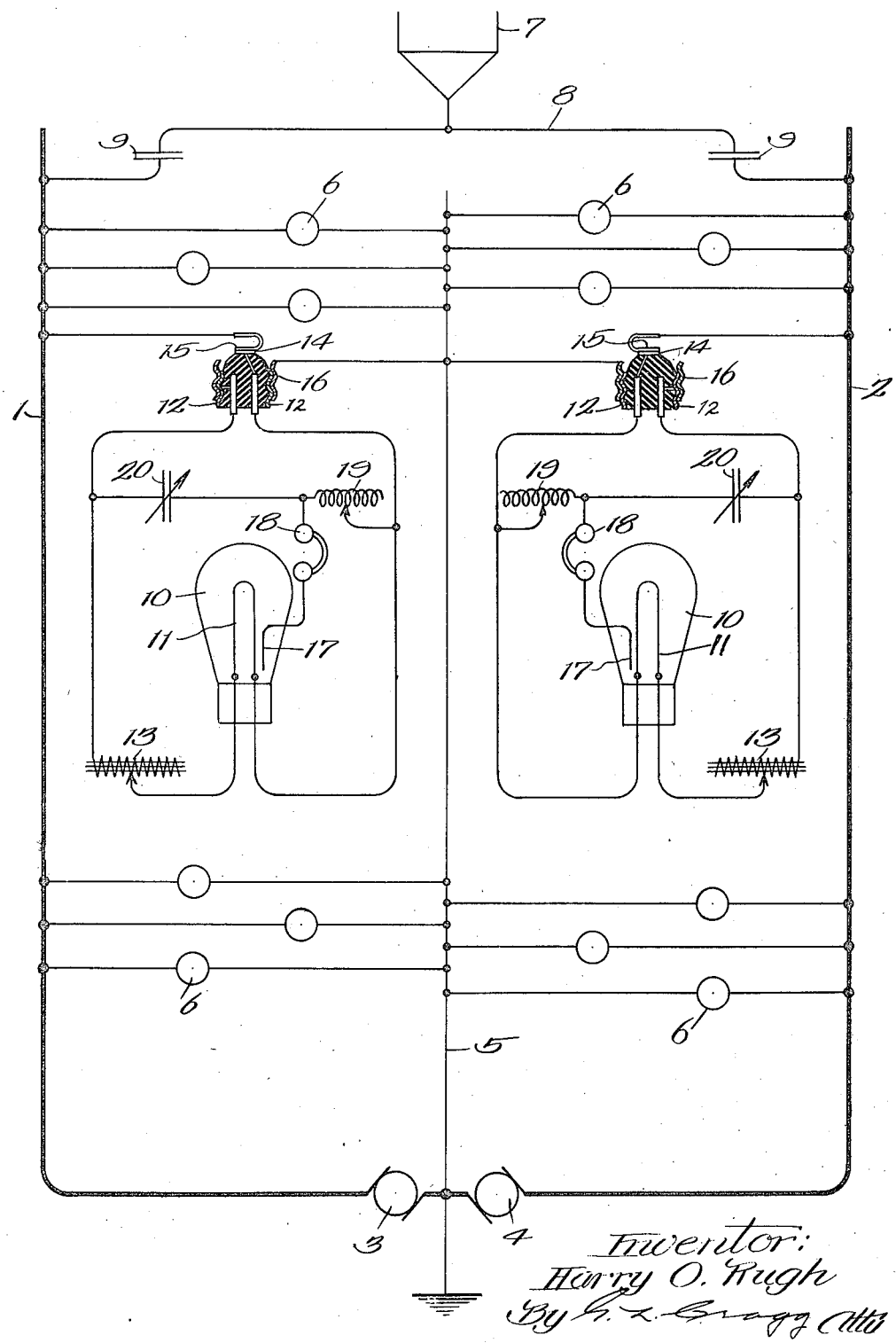
Inventor:
Harry O. Rugh Patented Nov. 18, 1924.

1,516,061

UNITED STATES PATENT OFFICE.

HARRY O. RUGH, OF CHICAGO, ILLINOIS, ASSIGNOR TO RUGH AND NOBLE, INCORPORATED, OF CHICAGO, ILLINOIS, A CORPORATION OF ILLINOIS.

WIRELESS RECEIVING SYSTEM.

Application filed November 16, 1922. Serial No. 601,305.

*To all whom it may concern:*

Be it known that I, HARRY O. RUGH, citizen of the United States, residing at Chicago, in the county of Cook and State of Illinois, have invented a certain new and useful Improvement in Wireless Receiving Systems, of which the following is a full, clear, concise, and exact description.

My invention relates to wireless receiving systems and has a number of objects and advantages in view.

In accordance with one feature of the invention, commercial systems of electrical distribution enter into the formation of wireless receiving systems. In carrying out this feature of the invention the current rectifying bulbs or other rectifying devices are connected in bridge of the sides of a lighting circuit or other commercial system of electrical distribution, the current rectifying filaments or heating elements being in circuit with resistances that are serially in the same bridges therewith.

Commercial lighting systems employing generators in the form of dynamo electric machines are especially adapted to be incorporated in wireless receiving systems and in such event the aforesaid resistances are inductively wound upon magnetizable cores to serve as choke coils to eliminate the hum of the generators.

The aerials or antennæ are connected each with a side of such a system of distribution, condensers being included between the aerials and the circuit sides to which they pertain to enable the aerials properly to function as such and also to guard against short circuiting of the systems. I have practiced my invention in conjunction with a three wire system of electrical distribution by associating one aerial with the mains of the system with a condenser preferably interposed between each main and the aerial. The neutral conductor in such a system is usually grounded and is connected between the divisions of a divided source of current as is well understood by those skilled in the art.

Each of the two sides of the three wire system may have a rectifying bulb and attendant equipment associated therewith. In order to guard against the passage of incoming signaling or telephonic current from the rectifying electrodes to ground such electrodes are placed nearer the ends of the filaments that are connected with the mains or ungrounded sides of the three wire system. These rectifying electrodes may be in the form of wires which extend along short portions of the ungrounded ends of the filaments.

The invention will be more fully explained by reference to the accompanying drawing which is a diagrammatic illustration of the preferred embodiment thereof.

The three wire system illustrated includes the outside conductors or mains 1 and 2 having a source of current connected therewith, this source of current being a dynamo electric machine having divisions 3 and 4 each individual to a side of the system. The neutral conductor 5 is grounded and is connected with and between the divisions of the generator. Incandescent electric lamps 6 or other translating devices are connected in bridge between each main conductor and the neutral conductor in a manner well understood. The main conductors are constituted extensions of the aerial 7 by means of the bridge conductor 8 that is connected with the mains 1 and 2 and which includes two condensers 9. one between each main and the aerial.

Each audion or rectifying bulb 10 has one terminal of its filament 11 connected with the plug contact 12 through the resistance 13 of a rheostat. The other terminal of each filament is connected with a plug contact 14. Both of the plug contacts 12 and 14 pertaining to each bulb 10 and its heating element 11 are parts of a connecting plug receivable in any of the lamp sockets provided for the lamps 6, each contact 12 engaging the threaded metallic shell 16 of such a socket and each contact 14 engaging the spring contact 15 of the socket. As illustrated, the metallic shells 16 are connected with the neutral conductor 5 and the contacts 15 are connected with the main 1 or the main 2 according to the side of the system to which the sockets pertain.

The audion current rectifying electrodes 17 are preferably in the form of wires and are associated with the ends of the filaments that are connected with the ungrounded sides of the system through the intermediation of the contacts 14 and 15. These electrodes are thus closer to the ungrounded ends of the filament than they are to the grounded ends thereof whereby leakage of rectified signaling or telephonic current to ground is reduced.

Each electrode 17, here taking part in rectifying the current but to which use it is not to be thus limited, is desirably included in circuit with its plug contact 14 through the telephone or other responsive device 18 (operable by the rectified current) and the adjustable inductive winding 19. A variable condenser 20 is desirably included in series with the winding 19 and in a bridge between the conductors leading to the contacts 12 and 14, the responsive device 18 having one terminal connected between such condenser and winding. Other arrangements, however, may be employed without departing from the spirit of my invention.

By the equipment illustrated each resistance 13 is included in bridge between the transmission conductors of its side of the three wire system. Thus the filament or heating element 11 of each audion or rectifying bulb is serially included in the same bridge with its adjusting resistance, the bridge conductors including these elements being in parallel with the other bridge conductors by which the incandescent lamps or other translating devices of the system are included in parallel with the divisions of the generator respectively supplying the same with current. In the system illustrated the generator develops direct current. In order that the hum of the generator may be reduced or eliminated the adjusting resistances 13 are inductively wound upon magnetizable cores to constitute choke coils.

The advantages in the equipment illustrated by the drawing will be very readily observed by those familiar with the art.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a wireless receiving system, the combination with the two main and the grounded neutral conductors of a three wire system of electrical distribution having a divided generator to and between the divisions of which the neutral conductor is connected; of an aerial; two condensers, one individual to each main conductor that is connected through its condenser with the aerial; lamp sockets individual to each side of the three wire system and connected between the main thereof and the neutral conductor; two current rectifying devices, one individual to each side of the three wire system; a plug for each rectifying device having contacts connected therewith and receivable in said sockets, each rectifying device having an electrode connected with its plug contact that is connectible with the corresponding main conductor through the socket receiving the plug; a resistance in each rectifying device circuit and in the same bridge therewith; and a responsive device subject to the current in the electrode circuit.

2. In a wireless receiving system, the combination with the two main and the grounded neutral conductor of a three wire system of electrical distribution having a divided generator to and between the divisions of which the neutral conductor is connected; of an aerial connected with each main through a condenser; lamp sockets individual to each side of the three wire system and connected between the main thereof and the neutral conductor; two current rectifying devices, one individual to each side of the three wire system; a plug for each rectifying device having contacts connected therewith and receivable in said sockets, each rectifying device having an electrode connected with its plug contact that is connectible with the corresponding main conductor through the socket receiving the plug; a resistance in each rectifying device circuit and in the same bridge therewith; and a responsive device subject to the current in the electrode circuit.

3. In a wireless receiving system, the combination with the two main and the grounded neutral conductor of a three wire system of electrical distribution having a divided generator to and between the divisions of which the neutral conductor is connected; of an aerial connected with each main; lamp sockets individual to each side of the three wire system and connected between the main thereof and the neutral conductor; two current rectifying devices, one individual to each side of the three wire system; a plug for each rectifying device having contacts connected therewith and receivable in said sockets, each rectifying device having an electrode connected with its plug contact that is connectible with the corresponding main conductor through the socket receiving the plug; a resistance in each rectifying device circuit and in the same bridge therewith; and a responsive device subject to the current in the electrode circuit.

4. A wireless receiving system including a circuit; a source of current between the sides of the circuit, one of these circuit sides being grounded and the other ungrounded; a current rectifying bulb having a filament in bridge of the circuit sides and an electrode associated with the filament, this electrode being nearer the end of the filament which is connected with the ungrounded circuit side than the other filament end; and a responsive device subject to the rectified current.

5. A wireless receiving system including a circuit; a source of current between the sides of the circuit, one of these circuit sides being grounded and the other ungrounded; a current rectifying heating element in bridge of the circuit sides and an electrode associated with the heating element, this electrode being nearer the end of the heating element which is connected with the ungrounded circuit side than the other end of the heating element; and a responsive device subject to the rectified current.

In witness whereof, I hereunto subscribe my name this 9th day of November, A. D. 1922.

HARRY O. RUGH.